United States Patent
Kojima et al.

(10) Patent No.: US 8,586,124 B2
(45) Date of Patent: Nov. 19, 2013

(54) CANDY AND METHOD FOR PRODUCING THE SAME

(75) Inventors: Takayuki Kojima, Saitama (JP); Hiroko Ogiwara, Saitama (JP); Ryohei Yamabe, Saitama (JP); Shingo Konno, Saitama (JP)

(73) Assignee: Lotte Co., Ltd, Tokyo (JP)

( * ) Notice: Subject to any disclaimer, the term of this patent is extended or adjusted under 35 U.S.C. 154(b) by 907 days.

(21) Appl. No.: 11/579,611

(22) PCT Filed: Feb. 21, 2005

(86) PCT No.: PCT/JP2005/002698
§ 371 (c)(1),
(2), (4) Date: Jul. 15, 2008

(87) PCT Pub. No.: WO2005/115161
PCT Pub. Date: Dec. 8, 2005

(65) Prior Publication Data
US 2008/0305231 A1    Dec. 11, 2008

(30) Foreign Application Priority Data
May 28, 2004   (JP) .................................. 2004-160209

(51) Int. Cl.
*A23G 3/00*   (2006.01)
*A23L 1/236*  (2006.01)

(52) U.S. Cl.
USPC ............................. 426/660; 426/658; 426/548

(58) Field of Classification Search
USPC .................... 426/548, 590, 658, 660
See application file for complete search history.

(56) References Cited

U.S. PATENT DOCUMENTS

| | | | |
|---|---|---|---|
| 4,883,685 A * | 11/1989 | Kondou | 426/658 |
| 5,536,511 A * | 7/1996  | Yatka  | 426/5   |
| 6,274,727 B1 * | 8/2001 | Maul et al. | 536/127 |

FOREIGN PATENT DOCUMENTS

| | | | |
|---|---|---|---|
| CA | 1080025 A | * | 6/1980 |
| EP | 0 941 668 | | 9/1999 |
| JP | 9-47222 | | 2/1997 |
| JP | 11289987 | | 10/1999 |
| JP | 11-343231 | | 12/1999 |
| JP | 2000-139356 | | 5/2000 |
| JP | 2003-212778 | | 7/2003 |
| JP | 4563077 | | 8/2010 |
| KR | 2002-007725 | | 1/2002 |
| WO | WO 9822094 A2 | * | 5/1998 |

OTHER PUBLICATIONS

Abridged English translation of Notice of Reason for Rejection issued in the priority application, JP 2004-160209.
English translation of Office Action drafted Sep. 22, 2010 and mailed Sep. 29, 2010 with respect to corresponding Japanese Patent Application No. 2009-112389.

* cited by examiner

*Primary Examiner* — Humera Sheikh
*Assistant Examiner* — Tynesha McClain-Coleman
(74) *Attorney, Agent, or Firm* — Scott R. Cox

(57) ABSTRACT

The present invention includes a candy and a method for producing it which solves the following problems: crystallization control, continuous production for mass production when the candy includes crystallization of xylitol; prevention of deterioration of the perceived coolness of xylitol, and loss of moisture absorption stability.

The includes xylitol and erythritol, wherein the candy is produced by a method including the steps of: heating and melting a compound containing xylitol and erythritol at a weight ratio ranging from 99:1 to 80:20; forming a preliminary product that keeps the melted sugar liquefied in a partly or fully crystallized xylitol fluid by maintaining a fluidity temperature which is below the melting point of xylitol forming the preliminary product into a desired shape; and cooling the formed product to room temperature.

2 Claims, No Drawings

CANDY AND METHOD FOR PRODUCING THE SAME

TECHNICAL FIELD

The present invention relates to a candy for bringing a perceived coolness in the mouth and a method for producing it. In particular, the present invention relates to the candy not only for bringing a perceived coolness in the mouth but also having moisture absorption stability, which comprises xylitol and erythritol, wherein the candy has an appropriate hardness and smoothness, wherein most of the candy is in a fine crystalline state. Also disclosed is a method for producing the candy.

PRIOR ART

In recent years, a number of new types of sugars have been developed. Various confectionery products making use of the characteristics of these sugars have been developed in the field of candies. Candy which brings a perceived coolness in the mouth is one example. It is known that sugars that bring an excellent perceived coolness upon melting of their crystals include erythritol, xylitol and sorbitol. Techniques to use xylitol in candies are particularly in demand for its strength in perceived coolness, its good-quality taste, and its dental health benefits.

Methods for encapsulating xylitol into the center of a candy and for adhering xylitol powders to the surface of a candy are already being implemented. With these methods, however, the duration of the perceived coolness can be perceived to be rather short, since the perceived coolness is only perceived at a start of licking the candy, at a point of crushing the candy or at the end of licking the candy. The perceived coolness does not last at all times while the candy is in the mouth.

On the other hand, Japanese laid-open patent publication No. H9-47222 discloses a method for producing a candy for continuously bringing a perceived coolness in the mouth, which comprises xylitol. However, according to this method, immediately after adding seed crystals into the melted state component, or immediately after depositing the fine crystals by agitation, the xylitol crystallizes In other words, the candy solidification proceeds irreversibly and in a very short time. Therefore, it was impossible to continuously produce the candy in an industrial mass production facility. Moreover, in order to control crystallization, an extremely strict temperature control is required, so that it is virtually impossible to carry out in the usual industrial production facility for producing candies.

Japanese patent publication No. 3460187 (JP 2000-139356) discloses another method for producing a candy which comprises xylitol for continuously bringing a perceived coolness in the mouth. According to this method, "a part of xylitol contents is replaced with sorbitol, and fine crystals are deposited during the molten state so that the candy for continuously bringing a perceived coolness is obtained". The perceived coolness, which is the most important characteristic in xylitol, decreases in proportion to the amount of xylitol replaced with sorbitol based on a sensory evaluation of the candy obtained by this method. In addition, there was a problem with the moisture absorption stability as a product when sorbitol is used together with xylitol.

Under this situation, the development of candy and a production method is desired in which xylitol is used, whereby the perceived coolness lasts at all times while the candy is in the mouth, which candy is easy to produce in mass production, and has sufficient moisture absorption stability.

DISCLOSURE OF THE INVENTION

Problems to be Solved by the Invention

An object of the present invention is to solve the problems with the conventional techniques described above, such as the difficulty in controlling the crystallization of a candy obtained by crystallization of xylitol, the difficulty in mass production of the candy, deterioration in the perceived coolness even if the crystallization could be controlled by using other raw materials, and the poor moisture absorption stability as a product. There is provided a candy and a method for producing it that solves these problems.

Means to Solve the Problems

In order to solve the problems mentioned above, the inventors have conducted an extensive and thorough research about a method for producing candy capable of controlling crystallization of xylitol easily suitable for practical use, and as a result found that the above-mentioned problems can be solved by using xylitol together with erythritol as the raw materials of a candy.

By using xylitol and erythritol together as the raw materials of a candy at the contents ratio of 99:1 to 80:20, the produced candy is mostly and minutely crystallized, the candy is smooth in texture, has an appropriate hardness, brings a perceived coolness in the mouth, and has a moisture absorption stability.

The method for producing a candy of the present invention comprises: a melting process that heats and melts a compound containing xylitol and erythritol; a forming process that keeps the obtained melted sugar liquefied in a partly or fully crystallized xylitol fluid by maintaining a fluidity temperature which is below the melting point of xylitol, and that forms the fluid into a desired shape; and a cooling process that cools the formed shape to room temperature, whereby crystallization of xylitol proceeds slowly in the mixed and melted sugar, so that the proportion of xylitol crystals occupying the mixed and melted sugar is maintained within a specific range, and the fluidity of the mixed and melted sugar is also maintained. As a result, temperature management of the mixed and melted sugar is easy enough to be carried out by a normal candy production facility. It is found that most of the obtained candy is in a minute crystalline state, so that the obtained candy has an appropriate hardness, smoothness, moisture absorption stability and a perceived coolness in the mouth. The preferred maintenance temperature is in a range of 65 to 80° C.

Effect of the Invention

According to the present invention, by using together xylitol and erythritol as raw materials of a candy at a contents ratio of 99:1 to 80:20, the obtained candy is mostly and minutely crystallized. Even when xylitol is being used, the candy is smooth in texture, and has an appropriate hardness, without forming an aggregation of large crystals that crumble into pieces at a small impact. The candy has a sufficient moisture absorption stability and a perceived coolness, and provides a long lasting perceived coolness in the mouth all the while the candy is being licked in the mouth. The method for producing a candy of the present invention provides the method for producing a candy suitable for mass industrial production, since the crystallization of the xylitol in the mixed and melted sugar slowly progesses, so that the proportion of xylitol crystals occupying the mixed and melted sugar is maintained within a specific range, and the fluidity of the mixed and melted sugar is maintained. As a result, the temperature management of the mixed and melted sugar is easy enough to be carried out by a normal candy production facility.

BEST MODE FOR CARRYING OUT THE INVENTION

Hereunder, embodiments of the present invention are described in detail with specific examples.

Xylitol, also called xylite, is a kind of pentitol, which is a sugar alcohol obtained by reduction of D-xylose, having a straight-chain structure with five hydroxides, $C_5H_{12}O_5$ (molecular weight: 152). Xylitol, having these characteristics, has the following well-known characteristics: sweet tasting; an excellent perceived coolness upon melting of the crystals; and causing no caries. Since xylitol has a high crystallization property, when used as a raw material in the candy production at the usual method, there is a technical problem from the formation of a huge crystal aggregation that readily crumbles into pieces upon a small impact. Moreover, the candy produced using xylitol as the raw material has a high moisture absorption property so that there is also a technical problem of the candies sticking together during storage, and of the candies melting. Accordingly, production of candies that utilize significant quantities of xylitol is not common.

On the other hand, erythritol is a kind of monosaccharide polyol, which is a sugar alcohol comprising four hydrocarbon atoms, and having a straight-chain structure with four hydroxides, $C_4H_{10}O_4$ (molecular weight: 122). Erythritol having this composition has the following well-known characteristics: sweet tasting; extremely low moisture absorption; and an excellent perceived coolness upon melting of the crystals.

The inventors of the present invention have examined the relationship of the ratio of xylitol contents to erythritol contents by weight, the feasibility of the xylitol crystallization control, and adaptability for industrial mass production, and as a result have found that by using a xylitol and erythritol contents ratio ranging from 99:1 to 80:20, xylitol crystallization control is facilitated, and most of the obtained candy is retained in a minute crystalline state so that such candy has a smooth texture and an appropriate hardness, without forming an aggregation of large crystals that crumble into pieces upon a small impact, and have sufficient moisture absorption stability, and a long lasting perceived coolness in the mouth all the while the candy is being licked in the mouth.

If the erythritol ratio is less than 1 part, the crystallization proceeds rapidly, and the crystal portion occupying the candy gets large, such that an arbitrary shape formation is a problem. As a result, the candy obtained forms a huge crystal aggregation that crumbles into pieces at a small impact. If a very small amount of heat is applied in an attempt to improve the forming property, all crystals are melted because the temperature range for the shape formation is very narrow, and it takes time to solidify even by cooling it.

Also, if the erythritol ratio is greater than 20 parts, the crystallization proceeds rapidly, and the crystal portion occupying the candy gets large, such that arbitrary shape formation is a problem. As a result, the candy obtained forms a huge crystal aggregation that crumbles into pieces at a small impact. If a very small amount of heat is applied in an attempt to improve the forming property, all crystals are melted because a temperature range for the shape formation is very narrow, and it takes time to solidify even by cooling it.

Hence, provided that the xylitol contents and erythritol contents range from 99:1 to 80:20 by weight ratio, sufficient practicality for production of the candy has been recognized. The crystallization proceeds slowly, and the temperature range of the shape formation is 5° C. or more.

Further, herewith, the progress of crystallization is visually recognizable by observing for a standard that the state of the melted sugar (syrup) changes to a turbid state, accompanying a second increase in the temperature of the melted sugar (syrup) during cooling and agitation. If the ratio of xylitol and erythritol is within the above range, the crystallization temperature is divided into 2 stages, whereby the erythritol crystallization occurs first followed by the xylitol crystallization. The crystallized candy should be cooled after having undergone 2 stages of the crystallization. Otherwise it will remarkably lose productivity taking a long time to solidify after cooling, so that the candy is unable to be mass produced.

Henceforth, if xylitol and erythritol are used together at a ratio ranging from 99:1 to 80:20, that is, if the weight ratio of erythritol is 1 part or more and 20 parts or less, the solidifying time is short, being five to six minutes. If the melted sugar of the candy is cooled and solidified down to room temperature, the inventors found that this ratio is sufficiently practical. As described above, according to the candy of the present invention, xylitol content and erythritol content range from 99:1 to 80:20 by weight ratio. In order to achieve a high productivity, the ideal content ratio is preferably from 98:2 to 90:10.

In regard to other components beside xylitol and erythritol, these are not particularly limited, and include acidulant, flavor, color, fruit extract, dairy product, other sugars, and various medicinal products. However, these should be limited within the range of not impacting xylitol crystallization.

In the melting process for the method for producing candy in the present invention, a composition containing xylitol and erythritol is melted by heating. In the melting process of the present invention, for example, the xylitol and erythritol may be mixed in a powdery state, heated and melted, and then the other components may be added to the mixture. Alternatively, the powdered xylitol and erythritol may be mixed with an appropriate amount of water, heated and dissolved, further heated, depressurized and concentrated by means of water evaporation, and other components may be added to the mixture, as long as each component is uniformly mixed and is in a melted state.

In the forming process of the method for producing candy in the present invention, the obtained melted material keeps its fluidity in which xylitol is partly or fully crystallized by maintaining a fluidity temperature which is below the melting point of xylitol, and is formed into a desired shape. In the forming process of the present invention, for example, the melted material may be cooled to a temperature of crystal deposition, which maintains its fluidity, and below the melting point of xylitol (92 to 96° C.). The xylitol contained is partly or fully crystallized. The method of crystal deposition in use may be to start crystallization by adding and mixing of fine seed crystals, or by agitation. The optimal temperature for the crystal deposition varies depending on the ratio of xylitol contents to erythritol contents. However, the preferred temperature range is about 65 to 80° C. According to the candy of the present invention, after partly or fully crystallizing the contained xylitol, so as to maintain the fluidity during formation, the temperature is maintained at 65 to 80° C. In this way, surprisingly, the irreversible crystallization does not proceed any faster, and the crystallized portion is maintained within a definite range. The fluidity is maintained for a long time for carrying out an arbitrary and free formation. Moreover, the fluid is swiftly solidified if cooled to room temperature after formation; therefore, its property is ideal for the continuous production in mass production. The forming process is preferably carried out while the state of fluidity is maintained; however, a process for keeping the state of fluidity may further be included before the forming process.

The method for producing the candy is not particularly limited. The method for producing the candy by pouring into a mold is, however, suitable since a sufficient fluidity can be maintained while the xylitol contained is crystallized in part or mostly, without rapid crystallization by maintaining temperature of the candy of the present invention.

Specific examples of the present invention are described in more detail hereinbelow; however, the present invention is not restricted by these examples.

Example 1

95 weight parts of crystalline xylitol on the market and 5 weight parts of crystalline erythritol on the market are mixed in a powdery state, heated and melted at 140° C. The melted sugar is agitated and cooled, and after the xylitol crystals are deposited, while maintaining the temperature of 70 to 80° C., the melted sugar is poured into a mold and shaped. The shaped solid is further cooled and solidified at 20° C. for 5 minutes, and then the solid is removed from the mold. The candy is prepared accordingly. In the present production method, the melted sugar could be maintained in a sufficient fluidity state while being formed into shapes. According to the sensory evaluation of the candy obtained, the candy has a sufficient perceived coolness, rich in flavor, an excellent sweetness, a smooth texture, and an appropriate hardness. Moreover, the candy brought the excellent perceived coolness all the while the candy is in the mouth.

Example 2

90 weight parts of crystalline xylitol on the market and 10 weight parts of crystalline erythritol on the market are mixed in a powdery state, heated and melted at 140° C. The melted sugar is agitated and cooled, and after the xylitol crystals are deposited, while maintaining the temperature of 70 to 80° C., the melted sugar is poured into a mold and shaped. The shaped solid is further cooled and solidified at 20° C. for 5 minutes, and then the solid is removed from the mold. The candy is prepared accordingly. In the present production method, the melted sugar could be maintained in a sufficient fluidity state while being formed into shapes. According to the sensory evaluation of the candy obtained, the candy has a sufficient perceived coolness, rich in flavor, an excellent sweetness, a smooth texture, and an appropriate hardness. Moreover, the candy brought the excellent perceived coolness all the while the candy is in the mouth.

Example 3

80 weight parts of crystalline xylitol on the market and 20 weight parts of crystalline erythritol on the market are mixed in a powdery state, heated and melted at 140° C. The melted sugar is agitated and cooled, and after the xylitol crystals are deposited, while maintaining the temperature of 70 to 80° C., the melted sugar is poured into a mold and shaped. The shaped solid is further cooled and solidified at 20° C. for 5 minutes, and then the solid is removed from the mold. The candy is prepared accordingly. In the present production method, the melted sugar could be maintained in a sufficient fluidity state while being formed into shapes. According to the sensory evaluation of the candy obtained, the candy has a sufficient perceived coolness, rich in flavor, an excellent sweetness, a smooth texture, and an appropriate hardness. Moreover, the candy brought the excellent perceived coolness all the while the candy is in the mouth.

Example 4

98 weight parts of crystalline xylitol on the market and 2 weight parts of crystalline erythritol on the market are mixed in a powdery state, heated and melted at 140° C. The melted sugar is agitated and cooled, and after the xylitol crystals are deposited, while maintaining the temperature of 70 to 80° C., the melted sugar is poured into a mold and shaped. The shaped solid is further cooled and solidified at 20° C. for 5 minutes, and then the solid is removed from the mold. The candy is prepared accordingly. In the present production method, the melted sugar could be maintained in a sufficient fluidity state while being formed into shapes. According to the sensory evaluation of the candy obtained, the candy has a sufficient perceived coolness, rich in flavor, an excellent sweetness, a smooth texture, and an appropriate hardness. Moreover, the candy the candy brought the excellent perceived coolness all the while the candy is in the mouth.

Comparative Example 1

For comparison, 75 weight parts of crystalline xylitol on the market and 25 weight parts of crystalline erythritol on the market are mixed in a powdery state, heated and melted at 140° C. The melted sugar is agitated and cooled, and after the xylitol crystals are deposited, while maintaining the temperature of 70 to 80° C., the melted sugar is poured into a mold and shaped since the melted sugar could be maintained in sufficient fluidity state while being formed into shape. The shaped syrup is further cooled and solidified at 20° C. for 5 minutes, and then the solid is removed from the shape. The candy is prepared accordingly. However, the fluidity is lost from the starting point of the crystallization, so candy formation is possible at first, but with time, the candy could not be formed adequately by using the pouring formation method.

Comparative Example 2

For comparison, 100 weight parts of crystalline xylitol on the market is mixed in a powdery state, and the candy is prepared according to the same method as in example 1. However, the fluidity is lost from the starting point of the crystallization, so candy formation is possible at first, but with time, the crystallization proceeds rapidly and loses fluidity so that the candy is formed only by a small amount by using the pouring formation method.

Comparative Example 3

For comparison, 70 weight parts of crystalline xylitol on the market and 25 weight parts of crystalline erythritol on the market are mixed in a powdery state, and the candy is prepared according to the same method as in example 1. However, the fluidity is lost from the starting point of the crystallization, so candy formation is possible at first, but with time, the crystallization proceeds rapidly and loses fluidity so that the candy is formed only by a small amount by using the pouring formation method.

Comparative Example 4

For comparison, 95 weight parts of crystalline xylitol on the market and 5 weight parts of powdered sorbitol on the market are mixed in a powdery state, and the candy is prepared according to the same method as in the comparative example 1. However, the fluidity is lost from the starting point of the crystallization, so candy formation is possible at first, but with time, the crystallization proceeds progressively and loses fluidity so that the candy could not be formed adequately by using the pouring formation method.

Comparative Example 5

For comparison, 90 weight parts of crystalline xylitol on the market and 10 weight parts of powdered sorbitol on the market are mixed in a powdery state, and the candy is prepared according to the same method as in comparative example 1. However, the fluidity is lost from the starting point of the crystallization, so candy formation is possible at first, but with time, the crystallization proceeds progressively and loses fluidity so that the candy could not be formed adequately by using the pouring formation method.

Comparative Example 6

For comparison, 80 weight parts of crystalline xylitol on the market and 20 weight parts of powdered sorbitol on the market are mixed in a powdery state, and the candy is prepared according to the same method as in comparative example 1. However, the fluidity is lost from the starting point of the crystallization, so candy formation is possible at first, but with time, the crystallization proceeds progressively and loses fluidity so that the candy could not be formed adequately by using the pouring formation method.

Comparative Example 7

For comparison, 60 weight parts of crystalline sugar and 20 weight parts of liquid starch syrup (at solid state conversion) to which a small amount of water is added, heated, and melted, the mixture is heated and concentrated at 145° C., poured into a mold and cooled, and a typical transparent hard candy is obtained.

The candies of the examples 1 to 4, and comparative examples 1 to 7 are evaluated to test their influences on the candy production operability, perceived coolness, and moisture absorption, by adding erythritol at a specific ratio to xylitol.

Experiment 1

Evaluation of Operability of Candy Production

The candy production operability is evaluated and determined by observing the property of melted sugar during the production process. The evaluation standards are as follows: able to maintain a sufficient fluidity duration of the crystallized melted sugar (O); able to maintain fluidity duration for a short time (Δ); no fluidity due to rapid crystallization (x). The results are shown in Table 1.

TABLE 1

| Operatability of candy production | | | | | | | |
|---|---|---|---|---|---|---|---|
| Candy No. | Example 1 | Example 2 | Example 3 | Example 4 | Compare 1 | Compare 2 | Compare 3 |
| Xylitol (%) | 95 | 90 | 80 | 98 | 75 | 100 | 70 |
| Erythritol (%) (%) | 5 | 10 | 20 | 2 | 25 | | 30 |
| Melt T (° C.) | 140 | 140 | 140 | 140 | 140 | 140 | 140 |
| Operatibility | o | o | o | Δ | Δ | x | x |

As shown in Table 1, under the preparation conditions of examples 1 to 3 (xylitol 95 to 80%: erythritol 5 to 20%), the operability are favorable, where as in example 4 (xylitol 98%: erythritol 2%) the operability deteriorates a little, and furthermore in comparative example 1 (xylitol 75%: erythritol 25%) it deteriorates by a fair amount, and in comparative example 6 (xylitol 100%) and comparative example 7 (xylitol 70%: erythritol 30%) it deteriorates considerably.

Experiment 2

Sensory Examination of Perceived Coolness of Candy

The specialized panel members have conducted the sensory examination. The evaluation standards of the perceived coolness are as follows: obvious perceived coolness than xylitol (++); same perceived coolness as xylitol (+); slight deterioration in perceived coolness than xylitol (±); and obvious deterioration in perceived coolness than xylitol (−); and no perceived coolness (−−). The result is shown in Table 2.

TABLE 2

Comparison of perceived coolness of a candy

| Candy No. | Compare 2 | Example 1 | Example 2 | Example 3 | Compare 4 | Compare 5 | Compare 6 |
|---|---|---|---|---|---|---|---|
| Xylitol(%) | 100 | 95 | 90 | 80 | 95 | 90 | 80 |
| Erythritol (%) | | 5 | 10 | 20 | | | |
| Sorbitol (%) | | | | | 5 | 10 | 20 |
| Melt T (° C.) | 140 | 140 | 140 | 140 | 140 | 140 | 140 |
| Sensory Evaluation (coolness) | + | + | ± | ± | ± | − | − |

As shown in Table 2, the candies of example 1 and comparative example 2 bring an especially favorable perceived coolness. The candies of examples 2 and 3 also bring a favorable perceived coolness. The candy of example 4 (xylitol 95%: sorbitol 5%) did not bring a favorable perceived coolness. The candies of comparative examples 5 and 6 (xylitol 90 to 80%: sorbitol 10 to 20%) did not bring a perceived coolness.

Experiment 3

Moisture Absorption Examination of Candy

The candies of examples 1 to 4, and comparative examples 1 to 7 are kept in the constant temperature and humidity chamber (at 30° C. and 90% RH) for 24 hours, and their properties and the moisture absorption property have been observed and determined. The evaluation standards are as follows: keeping a sufficient moisture absorption stability equivalent to a typical sugar based candy (O); slight deterioration but able to maintain the moisture absorption stability if the candy is wrapped with airtight wrapping paper (Δ); unable to maintain moisture absorption stability due to high absorption (x). The results are shown in Table 3.

TABLE 3

Table 3: Comparison of moisture absorption of candy

| Candy No. | Compare 2 | Example 1 | Compare 4 | Example 3 | Compare 6 | Compare 7 |
|---|---|---|---|---|---|---|
| Xylitol (%) | 100 | 95 | 95 | 80 | 80 | |
| Erythritol (%) | | 5 | | 20 | | |
| Sorbitol (%) | | | 5 | | 20 | |
| Sugar (%) | | | | | | 60 |
| Malt Syrup (%) | | | | | | 40 |
| Melt T (° C.) | 140 | 140 | 140 | 140 | 140 | 140 |
| Moisture absorption weight increase rate (%) 30° C., 90% RH, 24 hrs | 3.1 | 2.8 | 3.2 | 3.5 | 4.1 | 2.5 |
| Moisture absorption | O~Δ | O | O~Δ | Δ | X | O |

As shown in Table 3, the moisture absorption is less in example 1 and comparative example 7 (sugar 60%, thick malt syrup 40%, at solid state conversion); the moisture absorption is fairly high in example 3, comparative examples 2 and 4; and the moisture absorption is prominent in example 6.

Accordingly, examples 1 to 4 (xylitol 98 to 80%: erythritol 2 to 20%) all show a favorable result in the candy production operability, perceived coolness, and moisture absorption property, among which the candy in example 1 (xylitol 95%: erythritol 5%) brings excellent perceived coolness in mouth all the while the candy is being licked in the mouth, has a very excellent sweetness quality, rich in flavor, a smooth texture, and excellent moisture absorption stability.

The invention claimed is:

1. A method for producing a candy not only for bringing a perceived coolness in a mouth but also having moisture absorption stability, comprising the steps of
    a melting process that heats and melts a compound containing powdery, crystalline xylitol and powdery, crystalline erythritol at a weight ratio ranging from 99:1 to 80:20,
    a forming process that keeps the obtained melted sugars liquefied in a crystallized xylitol fluid by maintaining a fluidity temperature in a range of 70 to 80° C., which is below the melting point of xylitol, so that the crystallization of the xylitol in the mixture of the melted xylitol and erythritol proceeds slowly to facilitate xylitol crystallization control, wherein erythritol crystallization occurs prior to xylitol crystallization and the temperature range of the shape formation is 5° C. or more;
    a cooling process wherein the fluid is solidified if cooled to 20° C. after formation and wherein the fluid is formed into a desired shape when cooled to 20° C.;

wherein the candy has hardness and smoothness, which can bring the perceived coolness while the candy is in the mouth, and the obtained candy pieces have a fine crystalline state that does not readily crumble into pieces upon slight force.

2. The method of claim 1 wherein the weight ratio of the xylitol to the erythritol is from 98:2 to 90:10.

* * * * *